(12) United States Patent
Cui

(10) Patent No.: US 7,577,147 B2
(45) Date of Patent: Aug. 18, 2009

(54) TRANSPARENT TRANSMISSION METHOD FOR ADMINISTRATIVE INFORMATION OF OPTICAL SYNCHRONOUS DIGITAL HIERARCHY DEVICES OF MULTI-VENDORS

(75) Inventor: Xiuguo Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 572 days.

(21) Appl. No.: 11/086,219

(22) Filed: Mar. 22, 2005

(65) Prior Publication Data

US 2005/0163054 A1 Jul. 28, 2005

Related U.S. Application Data

(63) Continuation of application No. PCT/CN03/00606, filed on Jul. 28, 2003.

(30) Foreign Application Priority Data

Sep. 23, 2002 (CN) ............................ 02 1 30967

(51) Int. Cl.
*H04L 12/28* (2006.01)
*H04J 3/16* (2006.01)
(52) U.S. Cl. ......................... 370/392; 370/467
(58) Field of Classification Search ................. 370/252, 370/254, 386, 389, 392, 393, 400, 401, 465–467, 370/476
See application file for complete search history.

(56) References Cited

U.S. PATENT DOCUMENTS

| 5,465,252 | A | * | 11/1995 | Muller ........................ 370/380 |
| 5,490,142 | A | | 2/1996 | Hurlocker |
| 5,572,515 | A | * | 11/1996 | Williamson et al. ......... 370/252 |
| 5,841,760 | A | | 11/1998 | Martin et al. |
| 5,857,092 | A | * | 1/1999 | Nakamura et al. ............ 710/62 |
| 5,987,027 | A | | 11/1999 | Park et al. |
| 6,094,440 | A | * | 7/2000 | Sugawara et al. ........... 370/465 |
| 6,128,284 | A | * | 10/2000 | Kawamura et al. .......... 370/241 |
| 6,411,631 | B1 | * | 6/2002 | Sugawara et al. ........... 370/465 |
| 6,714,531 | B1 | * | 3/2004 | Oide et al. .................. 370/349 |
| 6,765,928 | B1 | * | 7/2004 | Sethuram et al. ............ 370/476 |
| 6,781,958 | B1 | * | 8/2004 | Nagai ......................... 370/241 |
| 7,139,286 | B2 | * | 11/2006 | Akaike et al. ............... 370/466 |
| 7,173,930 | B2 | * | 2/2007 | Wellbaum et al. ........... 370/356 |
| 2002/0037019 | A1 | * | 3/2002 | Heuer ........................ 370/539 |
| 2002/0093949 | A1 | * | 7/2002 | Yasue et al. ................. 370/356 |
| 2005/0195855 | A1 | * | 9/2005 | Buskirk et al. .............. 370/465 |

FOREIGN PATENT DOCUMENTS

EP 1037421 A 9/2000

* cited by examiner

*Primary Examiner*—Hong Cho

(57) ABSTRACT

The invention discloses a transparent transmission method for administrative information of SDH devices manufactured by multi-vendors. First, idle overhead bytes of a frame structure of synchronous transfer mode are defined to transfer administrative information of other vendors. At each node of a transmission network, the administrative information is extracted and transformed to a uniform format. After time slot cross, transmission direction of each vendor's administrative information is defined. After format transformation has been implemented again, the administrative information of each vendor is inserted in a frame structure of a designated line. After that, the frame transfers each vendor's administrative information to other nodes, the rest can be deduced by analog, until administrative information of other vendors is transferred to a designated position. With this method, administrative information of SDH devices of multi-vendors can be transparently transmitted over SDH devices of a certain vendor. Moreover, this method is simple and reliable.

11 Claims, 3 Drawing Sheets

TRANSPARENT TRANSMISSION METHOD FOR ADMINISTRATIVE INFORMATION OF OPTICAL SYNCHRONOUS DIGITAL HIERARCHY DEVICES OF MULTI-VENDORS

CROSS-REFERENCE TO RELATED APPLICATIONS

This application is a continuation of international application no. PCT/CN2003/000606 filed on Jul. 28, 2003. This application claims the benefit of Chinese patent application no. 02130967.1 filed on Sep. 23, 2002. The disclosures of the above applications are incorporated herein by reference.

FIELD OF THE INVENTION

The present invention relates to optical synchronous digital transmission, especially to a transparent transmission method for administrative information of optical Synchronous Digital Hierarchy (SDH) devices of multi-vendors.

BACKGROUND OF THE INVENTION

As a new generation of network transmission mode, the SDH is consisted of SDH Network Elements (NE) and used for synchronous information transmission, multiplex and cross connection on optical fibers. The SDH technique employs a uniform Network Node Interface (NNI) worldwide, which simplifies the processing of signal interconnection, transmission, multiplexing, cross connection and exchange. The SDH has a set of standardized information structure levels, referred to synchronous transfer mode STM-1, STM-4, STM-16 and STM-64, and also has a block frame structure that has rich overhead bits, i.e. the remain part in the bit stream of NNI except the net load, which can be used for network operation, administration and maintenance (OAM). The basic SDH network elements include synchronous optical cable system, Synchronous Multiplexer (SM), Add-Drop Multiplexer (ADM) and Synchronous Digital Cross Connection (SDXC) devices etc. Each of them has a uniform standardized optical interface, so they are compatible on an optical cable, i.e., devices of different vendors can be interconnected on an optical circuit. Nevertheless, administrative information for SDH devices of other vendors cannot be transparently transmitted over SDH devices of a vendor in prior arts.

SUMMARY OF THE INVENTION

In view of this, it is an object of the invention to provide a transparent transmission method for administrative information of SDH devices of multi-vendors over SDH devices of a vendor in order that administrative information can be transferred between SDH devices of different vendors.

To achieve this object, the method comprises the steps of:
a. putting administrative information of a subnet device manufactured by a vendor which is different from the vendor that manufactures SDH devices in a backbone network into a designated area of a Synchronous Transfer Mode (STM-N) frame structure; and
b. sending the STM-N frame structure which has been processed in Step a to the backbone network device that is connected to the subnet, and then sending the frame structure to a device on the destination subnet through the backbone network.

In this method, Step a may further comprises: putting administrative information bytes of a vendor that is different from the vendor that manufactures devices in the backbone network into the designated idle overhead bytes at position of Data Communication Path Bytes (D1~D12) of a STM-N frame structure according to set; meanwhile putting service bytes and user channel bytes of said company into the designated idle overhead bytes at position of Service Bytes (E1, E2) and User Channel Bytes (F1) of the STM-N frame structure according to set.

In this method, Step b may further comprises: extracting administrative information bytes of a SDH device in a SDH network node that has received the frame structure, transforming them to a standard format, and then performing time slot cross for them; after that performing format transformation again and inserting the processed administrative information into a frame structure of a designated line, and then transferring the administrative information to the next designated node through this frame structure. Here, an overhead processor can be used for extracting and inserting said administrative information bytes.

Under this circumstance, transforming the administrative information bytes to a standard format comprises: putting administrative bytes, service bytes and user channel bytes of each company into the preset fixed time slot positions in a Field Programmable Logic Array (FPGA) according to company type. Meanwhile, line overhead data can be written into different RAMs for format transformation according to set; overhead data of each company with uniform format can be read out respectively, and a total overhead data can be generated through multiplexing. Here, a RAM can be divided into two halves: upper half area and lower half area, writing and reading line overhead data are separately implemented in upper half area and lower half area. When the reading pointer and the writing point are overlapped, the reading pointer can jump from one half to another half of the RAM and point to the same overhead byte.

In this method, performing format transformation for administrative information again may further comprise: writing the overhead data into different RAMs for processing according to set with a system clock, and reading out the overhead data with an overhead processor clock that is coincident with the system clock, wherein a RAM is divided into a upper half area and a lower half area, writing and reading line overhead data are separately implemented in upper half area and lower half area.

It can be seen from the technical scheme of the invention that idle overhead bytes in a frame structure of a synchronous transfer mode are defined for transferring administrative information of other companies according to set. During transmission, administrative information of other companies is put into the defined area of the frame structure, and the administrative information is transferred to the next node through this frame until it reaches the corresponding device of a destination network. With this method, administrative information of SDH devices of multi-vendors can be transparently transmitted over SDH devices of a certain vendor. Moreover, this method is simple and reliable.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention will be described in more detail hereinafter, with reference to the accompanying drawing and embodiments.

The invention relates to transparent transmitting administrative information of SDH devices of other vendors over SDH devices of a certain vendor. The invention applies idle overhead bytes in a frame structure of a synchronous transfer mode to transparently transmit administrative information of SDH devices of other vendors. First, in each node of a transmission network, the above-mentioned administrative information is extracted and transformed to a uniform format by a FPGA. After the transmission direction is defined through time slot cross, the administrative information is made format transformation by FPGA again and inserted to the defined line. In this way, the administrative information of SDH devices of other vendors can be transparently transmitted over SDH devices of a certain vendor.

Figure 1:
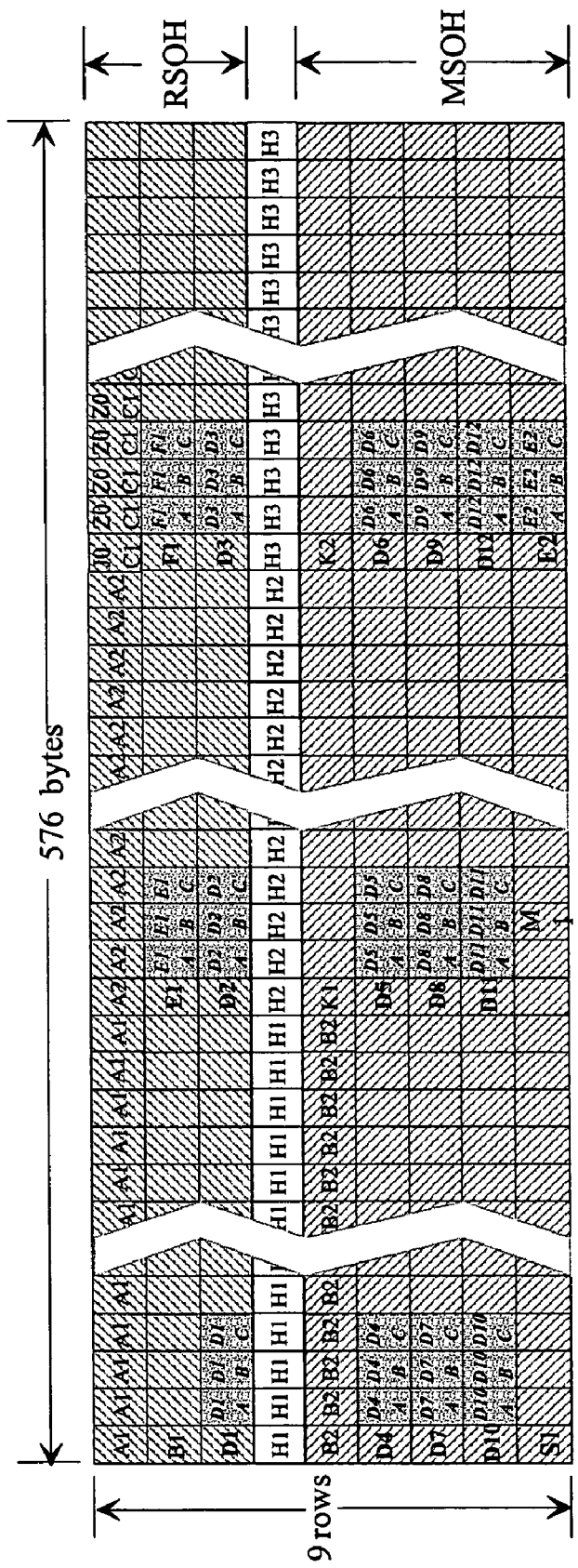
FIG. 1 is a schematic diagram illustrating segment overhead areas of a STM-64 frame structure.

Referring to FIG. 1 which is a schematic diagram illustrating segment overhead areas of a STM-64 frame structure, in the frame structure, the first to the 9 $N^{th}$ columns, the first to the third rows and the fifth to the ninth rows are usually set as segment overhead areas. Among them, the first to the third rows are set as regenerative segment overhead (RSOH) areas, and the fifth to the ninth rows are set as multiplex segment overhead (MOSH) areas. In these two areas, except for the segments that have been defined as overhead bytes for the frame structure itself, all of the others are idle overhead segments in which self-defined information can be put. In this embodiment, it is defined that 36 additive bytes of D1 [A:C] to D12[A:C] are used to transparently transmit administrative information for devices of other vendors (DCC), and 9 additive bytes of E1[A:C], E2[A:C] and F1[A:C] are used to transparently transmit E1, E2 and F1 for devices of other vendors. Here, suppose DCC, E1, E2 and F1 bytes for devices of three different vendors can be transparently transmitted over the backbone transmission network of company N, whereby three sets of bytes are defined for each byte.

Figure 2:
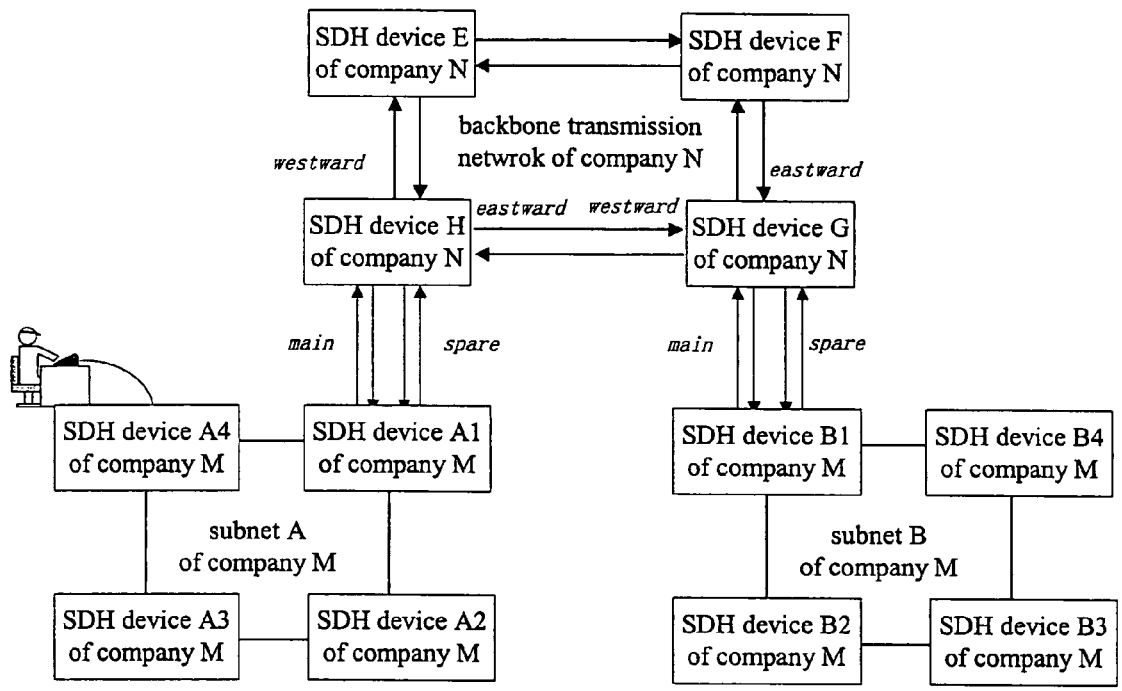
FIG. 2 is a schematic diagram illustrating structure of a network that consists of SDH devices of multi-vendors.

Referring to FIG. 2 which illustrates structure of a network that consists of SDH devices of multi-vendors, the SDH devices E, F, G and H of company N are located on the backbone transmission network, the network of company M consists of two subnets: A and B, the devices A1~A4 are located on subnet A and the devices B1~B4 are located on subnet B. Through main and spare optical fibers, the device A1 on subnet A of company M is connected to the device H of company N, the device B1 on subnet B of company M is connected to the device G of company N. The embodiment is directed to transmit administrative information for SDH devices of other companies through the backbone transmission network of company N. Taking SDH devices of company M as an example, in the subnet A of company M, administrative information for the SDH device A4 can be transferred to all devices on subnet A including the device A1, and will be output to the device H which is a connection node of subnet A and backbone transmission network via A1. In order to assure the transmission reliability, usually main optical fiber and spare optical fiber as shown in FIG. 2 are applied.

Figure 3:
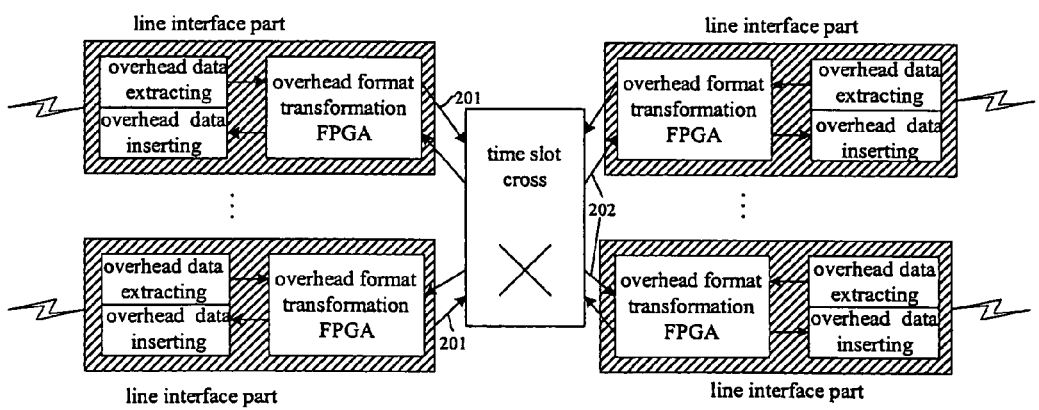
FIG. 3 is a block diagram illustrating an overhead data processing system of each node on a backbone transmission network.

FIG. 3 illustrates an overhead data processing for each node of company N. Referring to FIG. 3 and taking node H on backbone transmission network of company N as an example, transparently transmitting administrative information of subnet A of company M to subnet B of company M via backbone transmission network of company N at least comprises the following steps.

In the first step, administrative information bytes DCC and overhead bytes E1, E2 and F1 for node A1 of company M on both main and spare optical fibers are extracted by an overhead processor of node H of company N, and then transformed to overhead bytes with standard format as shown in Table 1 after overhead format transformation has been done by a FPGA. Table 1 specifically describes standard format of administrative information in the condition that administrative information of three companies is transparently transmitted. In Table 1, the above-mentioned standard format means that DCC, E1, E2 and F1 bytes of each company are stored in predefined time slots; [A:D] shows that except one set of information for company N itself, other three identical sets of storage space are used for transparent transmission of administrative information for other three companies.

Figure 4:
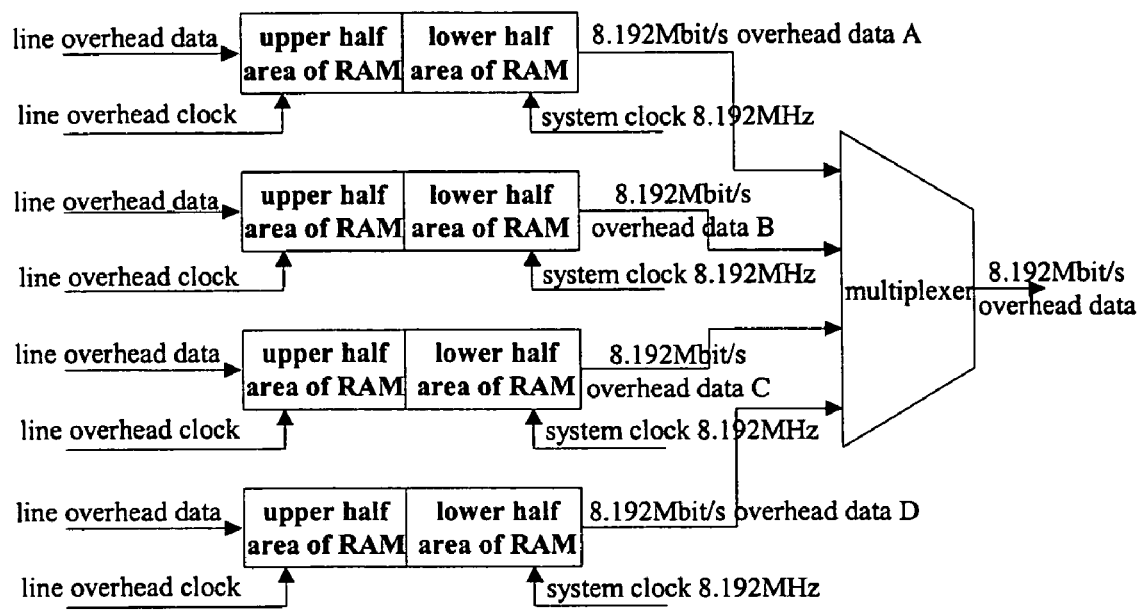
FIG. 4 is a block diagram illustrating an overhead processing in a FPGA in the line receiving direction.

Then, each set of overhead data are respectively written into a RAM. Referring to FIG. 4, each RAM is divided into two halves: upper half area and lower half area, each half area has 32 bytes. With a line overhead data clock, a set of overhead data is written into the RAM sequentially; and with a system clock, overhead data of each company is read out from the other end of the RAM sequentially. Writing and reading are implemented separately in the two halves, in other words, when data in the upper half area is being written, data in the lower half area is being read; on the contrary, when data in the upper half area is being read, data in the lower half area is being written. If the reading pointer is overlapped with the writing pointer, the reading pointer jumps to the same overhead byte in another half area, i.e. from upper half area to lower half area or vice versa. Overhead data of several RAMs are multiplexed to a single data bus. As shown in FIG. 4, when there are four sets of data, data in four RAM chips are multiplexed into overhead data with the transmission speed of 8.192 Mb/s, which are transferred to a time slot cross processor through the overhead bus 201 shown in FIG. 3.

TABLE 1

| Time Slot Position | Byte Name |
|---|---|
| 00:[A:D] | E1 |
| 01:[A:D] | F1 |
| 02:[A:D] | D1 |
| 03:[A:D] | D2 |
| 04:[A:D] | D3 |
| 05:[A:D] | Reserved. |
| 06:[A:D] | Reserved |

TABLE 1-continued

| Time Slot Position | Byte Name |
|---|---|
| 07:[A:D] | Reserved |
| 08:[A:D] | Reserved |
| 09:[A:D] | D4 |
| 10:[A:D] | Reserved |
| 11:[A:D] | D5 |
| 12:[A:D] | D6 |
| 13:[A:D] | D7 |
| 14:[A:D] | D8 |
| 15:[A:D] | D9 |
| 16:[A:D] | D10 |
| 17:[A:D] | D11 |
| 18:[A:D] | D12 |
| 19:[A:D] | Reserved |
| 20:[A:D] | E2 |
| 21:[A:D] | Reserved |
| 22:[A:D] | Reserved |
| 23:[A:D] | Reserved |
| 24:[A:D] | Reserved |
| 25:[A:D] | Reserved |
| 26:[A:D] | Reserved |
| 27:[A:D] | Reserved |
| 28:[A:D] | Reserved |
| 29:[A:D] | Reserved |
| 30:[A:D] | Reserved |
| 31:[A:D] | Reserved |

In the second step, the time slot cross processor makes time slot cross for overhead data to be transformed into standard format, so as to define transmission direction of overhead data corresponding to each company, and then outputs the processed overhead data to an overhead data format transformation FPGA through overhead bus 202.

In the third step, the FPGA makes format transformation for time slot crossed overhead data and writes them to different RAMs according to company type with the system clock, and then overhead data in each RAM chip are read out with overhead processor clock that is synchronized with the system clock, finally the overhead processor respectively inserts overhead data corresponding to each company into STM-64 frame structures of different lines.

The STM-64 frame transfers administrative information to different nodes, a node that has received the frame processes the administrative information again and transfers them to a designated node, the rest can be deduced by analog, until the administrative information corresponding to other companies has been transferred to the designated positions. Referring to FIG. 2 and taking administrative information of company M as an example, the node H of company N inserts administrative information of company M to the eastward line and the westward line, respectively, wherein said eastward line and westward line are called relative to the node H. The administrative information inserted to the eastward line is the main administrative information, and the administrative information inserted to the westward line is the spare administrative information. Similarly, there are the eastward line and the westward line of node G, as shown in FIG. 2, which are called relative to the node G. The main and spare administrative information inserted by the node H to its eastward line and westward line is transferred to the node G of company N. After the node G has extracted the administrative information, format transformation and time slot cross are made, and the administrative information of company M is inserted to the main lines and the spare lines between node G and node B1. Therefore, the administrative information of subnet A of company M is transferred to subnet B of company M.

In this invention, sets of idle overhead bytes in a synchronous transfer mode are defined to transfer administrative information of other companies. In each node of a transmission network, an overhead processor extracts administrative information bytes, a FPGA transforms them to a standard format, and then time slot cross is made to define transmission direction of the administrative information. After that, the administrative information is transformed again by a FPGA and inserted to frame structure of a designated line. With this mode, the administrative information is transferred continuously until it is transferred to the designated position. With the method, administrative information of SDH devices of other companies can be transparently transmitted over a SDH device of one company.

Although the present invention has been described with reference to specific exemplary embodiments, it will be evident that various modification and changes can be made to these embodiments without departing from the broader spirit of the invention as set forth in the claims. Accordingly, the specification and drawings are to be regarded in an illustrative sense rather than in a restrictive sense.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transparent transmission method for administrative information of optical synchronous digital hierarchy (SDH) devices of multi-vendors, comprising:

putting, by a first device in a first subnet connected to a backbone network, administrative information of the first device into a designated area of a first Synchronous Transfer Mode (STM-N) frame, the first device being manufactured by a vendor which is not the vendor manufacturing a SDH device in the backbone network;

sending, by the first device, the first STM-N frame to the SDH device in the backbone network, and then extracting, by the SDH device, the administrative information from the first STM-N frame, and sending a second STM-N frame including the administrative information to a second device in a destination subnet through the backbone network;

after extracting the administrative information from the first STM-N frame, transforming, by the SDH device in the backbone network, the administrative information to a standard format, and then performing time slot cross to define a transmission direction of the administrative information; and performing a second format transformation for the once-transformed administrative information and inserting the twice-transformed administrative information into the second STM-N frame of a designated line after the second format transformation, and then transferring the second STM-N frame to a next designated node.

2. The method of claim 1, wherein an overhead processor is used for extracting the administrative information and inserting the administrative information.

3. The method of claim 1, further comprising:

putting administrative information, service bytes and user channel bytes of each of the vendors into preset fixed time slot positions in a Field Programmable Logic Array (FPGA).

4. The method of claim 3, further comprising:

writing the administrative information, the service bytes, and the user channel bytes of each of the vendors into a designated RAM for format transformation respectively;

reading out the administrative information, the service bytes and the user channel bytes of each of the vendors in the standard format respectively, and generating total overhead data through multiplexing, wherein each of the designated RAMs is divided into an upper half area and a lower half area, and writing and reading the administrative information, the service bytes, and the user channel bytes are separately implemented in the upper half area and the lower half area.

5. The method of claim 4, further comprising:

when the reading pointer and the writing pointer of one of the designated RAMs are overlapped, the reading pointer jumping from one of the upper half area and the lower half area of the one designated RAM to the other and pointing to the same overhead byte.

6. The method of claim 1, wherein said performing a second format transformation comprises:

writing administrative information, service bytes and user channel bytes into different RAMs for processing with a system clock, and reading out the administrative information, the service bytes and the user channel bytes with an overhead processor clock that is synchronous with the system clock, wherein a RAM is divided into an upper half area and a lower half area, writing and reading the administrative information, the service bytes and the channel bytes are separately implemented in the upper half area and the lower half area.

7. The method of claim 1, wherein said putting administrative information of a first device comprises:

putting the administrative information into designated idle overhead bytes at the positions of Data Communication Path Bytes (D1~D12) of the first STM-N frame;

putting service bytes and user channel bytes into designated idle overhead bytes at the positions of Service Bytes (E1, E2) and User Channel Bytes (F1) of the first STM-N frame.

8. A transparent transmission method for administrative information of optical synchronous digital hierarchy (SDH) devices of multi-vendors, comprising:

putting, by a first device in a first subnet connected to a backbone network, administrative information of the first device into a designated area of a first Synchronous Transfer Mode (STM-N) frame, the first device being manufactured by a vendor which is not the vendor manufacturing a SDH device in the backbone network;

sending, by the first device, the first STM-N frame to the SDH device in the backbone network, and then extracting, by the SDH device, the administrative information from the first STM-N frame, and sending a second STM-N frame including the administrative information to a second device in a destination subnet through the backbone network; and putting administrative information, service bytes and user channel bytes of each of the vendors into preset fixed time slot positions in a Field Programmable Logic Array (FPGA).

9. The method of claim 8, further comprising:

writing the administrative information, the service bytes, and the user channel bytes of each of the vendors into a designated RAM for format transformation respectively;

reading out the administrative information, the service bytes and the user channel bytes of each of the vendors in the standard format respectively, and generating total overhead data through multiplexing, wherein each of the designated RAMs is divided into an upper half area and a lower half area, and writing and reading the administrative information, the service bytes, and the user channel bytes are separately implemented in the upper half area and the lower half area.

10. The method of claim 9, further comprising:

when the reading pointer and the writing pointer of one of the designated RAMs are overlapped, the reading pointer jumping from one of the upper half area and the lower half area of the one designated RAM to the other and pointing to the same overhead byte.

11. A transparent transmission method for administrative information of optical synchronous digital hierarchy (SDH) devices of multi-vendors, comprising:

putting, by a first device in a first subnet connected to a backbone network, administrative information of the first device into a designated area of a first Synchronous Transfer Mode (STM-N) frame, the first device being manufactured by a vendor which is not the vendor manufacturing a SDH device in the backbone network; and sending, by the first device, the first STM-N frame to the SDH device in the backbone network, and then extracting, by the SDH device, the administrative information from the first STM-N frame, and sending a second STM-N frame including the administrative information to a second device in a destination subnet through the backbone network;

wherein said performing a second format transformation comprises:

writing administrative information, service bytes and user channel bytes into different RAMs for processing with a system clock, and reading out the administrative information, the service bytes and the user channel bytes with an overhead processor clock that is synchronous with the system clock, wherein a RAM is divided into an upper half area and a lower half area, writing and reading the administrative information, the service bytes and the channel bytes are separately implemented in the upper half area and the lower half area.

* * * * *

UNITED STATES PATENT AND TRADEMARK OFFICE
CERTIFICATE OF CORRECTION

PATENT NO. : 7,577,147 B2  Page 1 of 1
APPLICATION NO. : 11/086219
DATED : August 18, 2009
INVENTOR(S) : Xiuguo Cui It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Seventh Day of September, 2010

David J. Kappos
*Director of the United States Patent and Trademark Office*